United States Patent
De Mattia

(10) Patent No.: US 9,409,351 B2
(45) Date of Patent: Aug. 9, 2016

(54) DEVICE FOR DEPOSITION OF FIBERS UPON A FRAME WITH CONCAVE CIRCULAR SECTIONS

(75) Inventor: Denis De Mattia, Basse Goulaine (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 1338 days.

(21) Appl. No.: 13/230,342

(22) Filed: Sep. 12, 2011

(65) Prior Publication Data

US 2012/0060755 A1 Mar. 15, 2012

(30) Foreign Application Priority Data

Sep. 14, 2010 (FR) ...................................... 10 57310

(51) Int. Cl.
| | |
|---|---|
| *B05C 1/06* | (2006.01) |
| *B24D 11/00* | (2006.01) |
| *B29C 70/38* | (2006.01) |
| *B29L 31/30* | (2006.01) |

(52) U.S. Cl.
CPC ............. *B29C 70/386* (2013.01); *B29C 70/388* (2013.01); *B29L 2031/3082* (2013.01)

(58) Field of Classification Search
USPC .......... 118/256–264, 308; 156/279, 538, 247, 156/574, 523, 166
See application file for complete search history.

(56) References Cited

U.S. PATENT DOCUMENTS

| | | | |
|---|---|---|---|
| 4,574,029 A | | 3/1986 | Murray |
| 4,750,965 A | * | 6/1988 | Pippel et al. ................... 156/361 |
| 4,842,684 A | * | 6/1989 | Tillement ................ B29C 41/12 |
| | | | 156/247 |
| 2005/0023414 A1 | | 2/2005 | Braun |
| 2008/0196825 A1 | | 8/2008 | Hamlyn |

FOREIGN PATENT DOCUMENTS

| | | |
|---|---|---|
| FR | 2 912 680 A1 | 8/2008 |
| WO | 2010/055063 A1 | 5/2010 |

OTHER PUBLICATIONS

French Search Report, dated May 3, 2011, from corresponding PCT application.

* cited by examiner

*Primary Examiner* — Yewebdar Tadesse
(74) *Attorney, Agent, or Firm* — Young & Thompson

(57) ABSTRACT

A device for deposition of fibers on a support (30) for producing a panel with an axis of revolution, includes a deposition head (32) and elements for positioning the deposition head relative to the support (30), with the positioning elements of the deposition head having kinematics including a first translation in a first direction (X) that is parallel to the axis of revolution, a second translation in a second direction (W) making it possible to come more or less close to the head of the support, a first rotation (C) around a first rotary axis combined with the second direction (W), and a second rotation (B) around a second rotary axis that is perpendicular to the first and second directions, wherein the kinematics of the positioning elements of the head include a third rotation (A) around a third axis of rotation that is parallel to the first direction (X).

6 Claims, 2 Drawing Sheets

DEVICE FOR DEPOSITION OF FIBERS UPON A FRAME WITH CONCAVE CIRCULAR SECTIONS

BACKGROUND OF THE INVENTION

1. Field of the Invention

This invention relates to a device for deposition of fibers for producing a panel with concave circular cross-sections such as an aircraft fuselage section.

2. Description of the Related Art

In the field of aeronautics, it is known to use composite materials to produce in particular elements of large dimensions, such as parts of the fuselage or the wing.

To produce such elements, one stage consists in depositing pre-impregnated fiber strips on a support whose shape corresponds to one of the surfaces of the element to be produced.

Hereinafter, fiber is defined both as fiber as well as several fibers or a more or less wide strip of fibers.

Figure 1:
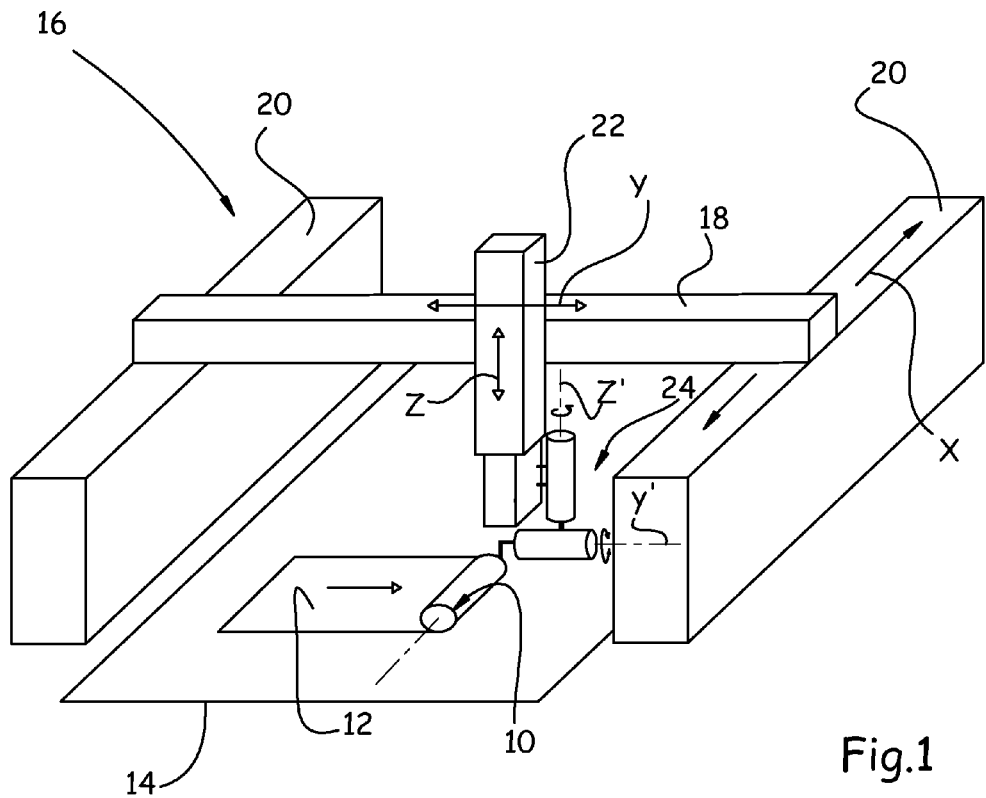

For the deposition of fibers, it is possible to use a device for deposition of fibers as illustrated in FIG. 1.

This device comprises, on the one hand, a deposition head 10 shown in a diagram in the form of a cylinder from which a strip 12 is unwound onto a support 14, and, on the other hand, a so-called five-axis machine 16 comprising a Cartesian structure with a crosspiece 18 that can move translationally along rails 20 that create, in the X direction, an upright 22 that can move translationally along the crosspiece 18 that corresponds to the Y direction, whereby said upright 22 is telescopic and corresponds to the Z direction. At the lower end of the upright, a support 24 is provided for the deposition head comprising joints that make it possible to orient the head in a first rotation around a rotary axis Z' that is parallel to the Z direction and in a second rotation around a rotary axis Y' that is perpendicular to the deposition direction of the strip and to the Z direction.

This type of device makes it possible to deposit fibers on a flat or slightly curved support to produce, for example, aircraft wing panels.

This device may also be suitable for producing fuselage panels that extend over a great length and over a reduced angular sector.

Thus, because of the technology used for depositing the fibers, it is necessary to provide at least four panels for the same section.

However, the more panels to be assembled that a section comprises, the higher its cost, its weight and its manufacturing time in particular because of the connecting zones between the panels. One approach for rationalizing the costs and the manufacturing times consists in reducing the number of panels for the same section.

SUMMARY OF THE INVENTION

Figure 2:
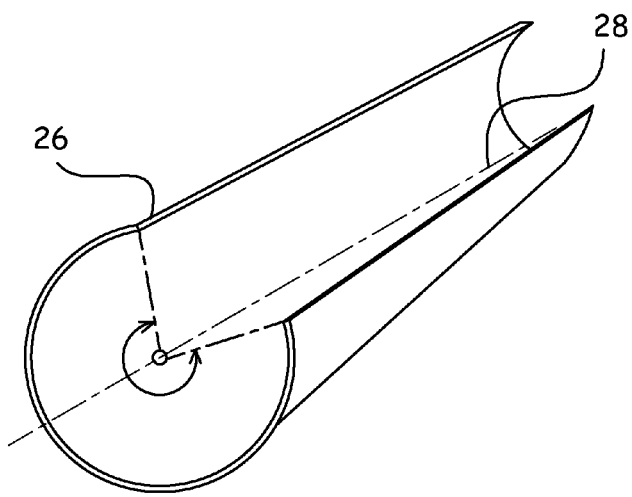

Consequently, this invention has as its object producing a panel of a section that corresponds to a significant angular sector forming an angle θ on the order of 240°, as illustrated in FIG. 2.

A first approach could consist in providing an additional rotary axis at the deposition device to make the Cartesian structure pivot. However, this approach cannot be considered, taking into account the weight and the bulk of the Cartesian structure.

Another approach could consist in making the support on which the fibers are deposited pivot. However, this approach cannot be considered because on such an angular sector, the support inevitably interferes with the deposition device.

The purpose of the invention is to eliminate the drawbacks of the prior art by proposing a device for deposition of fibers that makes possible the production of a panel with circular cross-sections forming an angular sector that can attain an angle θ on the order of 240°, such as a panel of a fuselage section of an aircraft.

For this purpose, the invention has as its object a device for deposition of fibers on a support for producing a panel with an axis of revolution, said device comprising, on the one hand, a deposition head and means for positioning said deposition head relative to the support, with the positioning means of the deposition head having kinematics comprising a first translation in a first direction parallel to the axis of revolution, a second translation in a second direction making it possible to come more or less close to the head of the support, a first rotation around a first rotary axis combined with the second direction, and a second rotation around a second rotary axis that is perpendicular to the first and second directions, characterized in that the kinematics of the positioning means of the head comprises a third rotation around a third axis of rotation that is parallel to the first direction.

BRIEF DESCRIPTION OF THE DRAWING FIGURES

Figure 3:
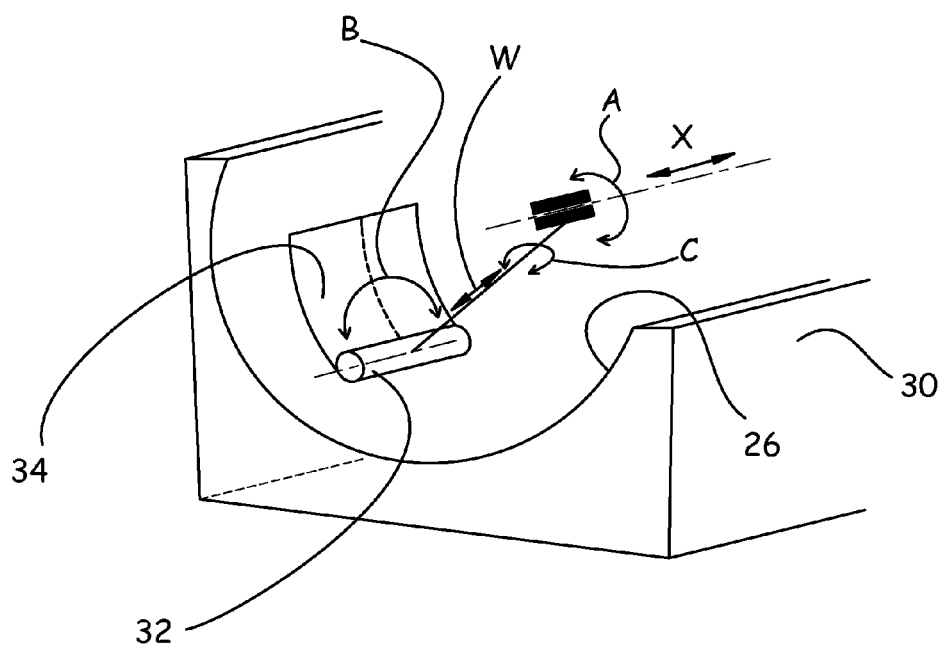
Figure 4:
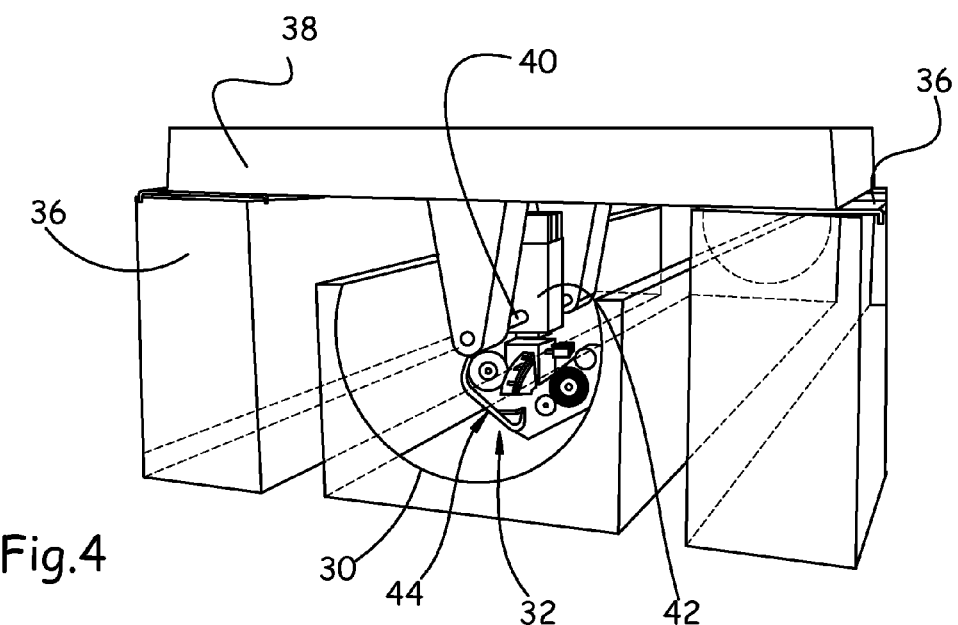

Other characteristics and advantages will become apparent from the following description of the invention, a description that is provided only by way of example, relative to the accompanying drawings, in which:

FIG. 1 is a diagram that illustrates a deposition device according to the prior art, FIG. 2 is a perspective view of a panel that is made by using a deposition device according to the invention, FIG. 3 is a diagrammatic view that illustrates the kinematics of a deposition device according to the invention, and FIG. 4 is a perspective view of a deposition device according to the invention.

DETAILED DESCRIPTION OF THE INVENTION

A fuselage section can consist of panels 26 made of composite material that comprises at least one skin that is produced from fibers that are woven in a resin matrix.

The fibers and the resin are not described in more detail because they may vary based on the characteristics that are desired for the panel.

The panel 26 is a surface that can be developed and that comprises cross-sections of essentially circular shapes. Thus, the panel comprises an axis of revolution 28, containing the centers of different circular cross-sections.

The panel 26 can extend over a length on the order of 25 m and over an angular sector that forms an angle θ on the order of 240°.

Although described as applied to an aircraft fuselage panel, the invention is not limited to this application and to these dimensions.

To produce such a panel, on the one hand, a support 30 that comprises a surface whose shapes are identical to the outside surface of the panel 26 that is to be produced is used, and, on the other hand, a device for deposition of fibers comprising a deposition head 32 and means for positioning said deposition head 32 relative to the support 30 is used.

In FIG. 3, the deposition head 32 is shown in a diagram in the form of a roller from which fibers are unwound in the form of a strip 34.

The support 30 and the deposition head 32 are not presented in more detail because they are known to one skilled in the art.

The means for positioning the deposition head 32 have kinematics comprising a first translation in a first X direction that is parallel to the axis of revolution 28, a second translation in a second W direction whose purpose is to come more or less close to the head 32 of the support 30, a first rotation that is created by the double arrow C around a first rotary axis combined with the W direction and a second rotation that is created by the double arrow B around a second rotary axis that is perpendicular to the X and W directions.

According to the invention, the kinematics of the means for positioning the head comprises a third rotation that is created by the double arrow A around a third axis of rotation that is parallel to the X direction and essentially combined with the axis of revolution 28 of the panel 26 to be produced.

This third rotation A is placed between the two X and W translations and replaces the translational movement Y of the Cartesian structure of the prior art.

The fact of splitting the positioning means on both sides of the axis of rotation A makes it possible to limit the weight of the parts in movement around said axis A and makes it possible to increase the range of the angular section of the cross-sections of panel 26.

It is not necessary to combine the axis of rotation A with the axis of revolution 28 of the panel, since the control of the position of the center of the roller is done in cylindrical coordinates.

According to one embodiment, the positioning means comprise two parallel rails 36 that are arranged in the X direction, a crosspiece 38 whose ends move translationally along said rails 36, a shaft 40 that corresponds to the axis of rotation A and whose ends are connected to two forks that are integral with the crosspiece 38, a telescopic upright 42 whose first end can pivot relative to the shaft 40 and whose other end can move translationally relative to the first end in the W direction, and a joint 44 that connects the deposition head 32 to the second end of the telescopic upright 42 and that comprises the two rotations B and C.

The joint 44 and the deposition head are not presented in more detail because they are known from the prior art and may be identical to those of the devices of the prior art.

According to another variant, the ends of the shaft 40 could pivot in bearings provided at each fork, and the telescopic upright 42 could be stationary relative to the shaft 40.

Advantageously, the deposition device comprises a frame to which the support 30 and the rails 36 are connected.

The support 30, the rails 36, the crosspiece 38 and the shaft 40 are arranged in such a way that the axis of revolution 28 of the support is essentially combined with the shaft 40.

According to a first variant, a power plant can be carried by the telescopic upright for driving it in rotation relative to the shaft.

According to another variant, a power plant can be provided at a fork for driving the shaft 40 in rotation.

The rails, the crosspiece, and the connection between these two elements can be identical to those of the devices of the prior art. It is the same for the telescopic upright 42 that can be identical to the upright 22 of the device of the prior art.

The invention claimed is:

1. A device for deposition of fibers on a support for producing a panel with an axis of revolution, said device comprising:
    a deposition head; and
    means for positioning said deposition head relative to the support, the means for positioning having kinematics comprising
        a first translation in a first direction that is parallel to the axis of revolution,
        a second translation in a second direction making possible to bring the deposition head close to the support,
        a first rotation around a first rotary axis combined with the second direction,
        a second rotation around a second rotary axis that is perpendicular to the first and second directions, and
        a third rotation around a third axis of rotation that is parallel to the first direction, the third axis of rotation being combined with the axis of revolution of the panel to be produced, and the third rotation is placed between the two translations,
    wherein
    the means for positioning is configured to be split on both sides of the third axis of rotation makes possible to limit the weight of parts in movement around said third axis of rotation and makes possible to increase the range of the angular section of the cross-sections of panel, and it is not necessary to combine the third axis of rotation with the axis of revolution of the panel, since the control of the position of the center of the roller is done in cylindrical coordinates, and
    the device further comprises:
        a crosspiece that moves translationally in the first direction,
        a telescopic upright,
        a joint that connects one end of the telescopic upright to the deposition head comprising the first and second rotations, and
        a shaft that corresponds to the third axis of rotation of the third rotation and whose ends are connected to two forks that are integral with the crosspiece, whereby the telescopic upright is able to pivot around said shaft.

2. The device for deposition of fibers according to claim 1, further comprising a frame on which the support and rails are connected parallel to the first direction and along which the crosspiece moves translationally, with the support, the rails, the crosspiece, and the shaft being arranged in such a way that the axis of revolution of the support is combined with the shaft.

3. A device for deposition of fibers on a support for producing a panel with an axis of revolution, said device comprising:
    a deposition head; and
    means for positioning said deposition head relative to the support, the means for positioning having kinematics comprising
        a first translation in a first direction that is parallel to the axis of revolution,
        a second translation in a second direction making possible to bring the deposition head close to the support,
        a first rotation around a first rotary axis combined with the second direction,
        a second rotation around a second rotary axis that is perpendicular to the first and second directions, and
        a third rotation around a third axis of rotation that is parallel to the first direction, the third axis of rotation being combined with the axis of revolution of the panel to be produced, and the third rotation is placed between the two translations,
    wherein the means for positioning is configured to be split on both sides of the third axis of rotation makes possible to limit the weight of parts in movement around said third axis of rotation and makes possible to increase the range of the angular section of the cross-sections of panel, and it is not necessary to combine the third axis of rotation with the axis of revolution of the panel, since the control of the position of the center of the roller is done in cylindrical coordinates, and wherein said device further comprises a crosspiece that moves translationally in the first direction, a telescopic upright, and a joint that connects one end of the telescopic upright to the deposition head that comprises the first and second rotations, and a shaft that corresponds to the axis of rotation of the third rotation and whose ends are mounted to pivot relative to forks that are integral with the crosspiece, with the telescopic upright being stationary relative to the shaft.

4. The device for deposition of fibers according to claim 3, further comprising a frame on which the support and rails are connected parallel to the first direction and along which the crosspiece moves translationally, with the support, the rails, the crosspiece, and the shaft being arranged in such a way that the axis of revolution of the support is combined with the shaft.

5. A device for deposition of fibers on a support for producing a panel with an axis of revolution and an angular sector forming an angle of an order of 240°, said device comprising:
 a deposition head; and
 a positioning device adapted for positioning said deposition head relative to the support, the positioning device configured to perform
  a first translation in a first direction that is parallel to the axis of revolution,
  a second translation in a second direction making possible to bring the deposition head close to the support,
  a first rotation around a first rotary axis combined with the second direction,
  a second rotation around a second rotary axis that is perpendicular to the first and second directions, and
  a third rotation around a third axis of rotation that is parallel to the first direction, the third axis of rotation being combined with the axis of revolution of the panel to be produced, and the third rotation is placed between the two translations, wherein
 splitting the positioning means on both sides of the third axis of rotation makes possible to limit the weight of parts in movement around said third axis of rotation and makes possible to increase the range of the angular section of the cross-sections of panel, and there is no need to combine the third axis of rotation with the axis of revolution of the panel, since the control of the position of the center of the roller is done in cylindrical coordinates, and wherein
 said device further comprises a crosspiece that moves translationally in the first direction, a telescopic upright, a joint that connects one end of the telescopic upright to the deposition head comprising the first and second rotations, and a shaft that corresponds to the axis of rotation of the third rotation and whose ends are connected to two forks that are integral with the crosspiece, whereby the telescopic upright is able to pivot around said shaft.

6. A device for deposition of fibers on a support for producing a panel with an axis of revolution and an angular sector forming an angle of an order of 240°, said device comprising:
 a deposition head; and
 a positioning device adapted for positioning said deposition head relative to the support, the positioning device configured to perform
  a first translation in a first direction that is parallel to the axis of revolution,
  a second translation in a second direction making possible to bring the deposition head close to the support,
  a first rotation around a first rotary axis combined with the second direction,
  a second rotation around a second rotary axis that is perpendicular to the first and second directions, and
  a third rotation around a third axis of rotation that is parallel to the first direction, the third axis of rotation being combined with the axis of revolution of the panel to be produced, and the third rotation is placed between the two translations, wherein
 splitting the positioning means on both sides of the third axis of rotation makes possible to limit the weight of parts in movement around said third axis of rotation and makes possible to increase the range of the angular section of the cross-sections of panel, and there is no need to combine the third axis of rotation with the axis of revolution of the panel, since the control of the position of the center of the roller is done in cylindrical coordinates, and wherein
 said device further comprises a crosspiece that moves translationally in the first direction, a telescopic upright, a joint that connects one end of the telescopic upright to the deposition head that comprises the first and second rotations, and a shaft that corresponds to the axis of rotation of the third rotation and whose ends are mounted to pivot relative to forks that are integral with the crosspiece, with the telescopic upright being stationary relative to the shaft.

* * * * *